Oct. 21, 1952    J. M. LAUNDER    2,614,672
OVERLOAD RELEASE FOR LOAD ACTUATOR
Filed Dec. 26, 1947    2 SHEETS—SHEET 1
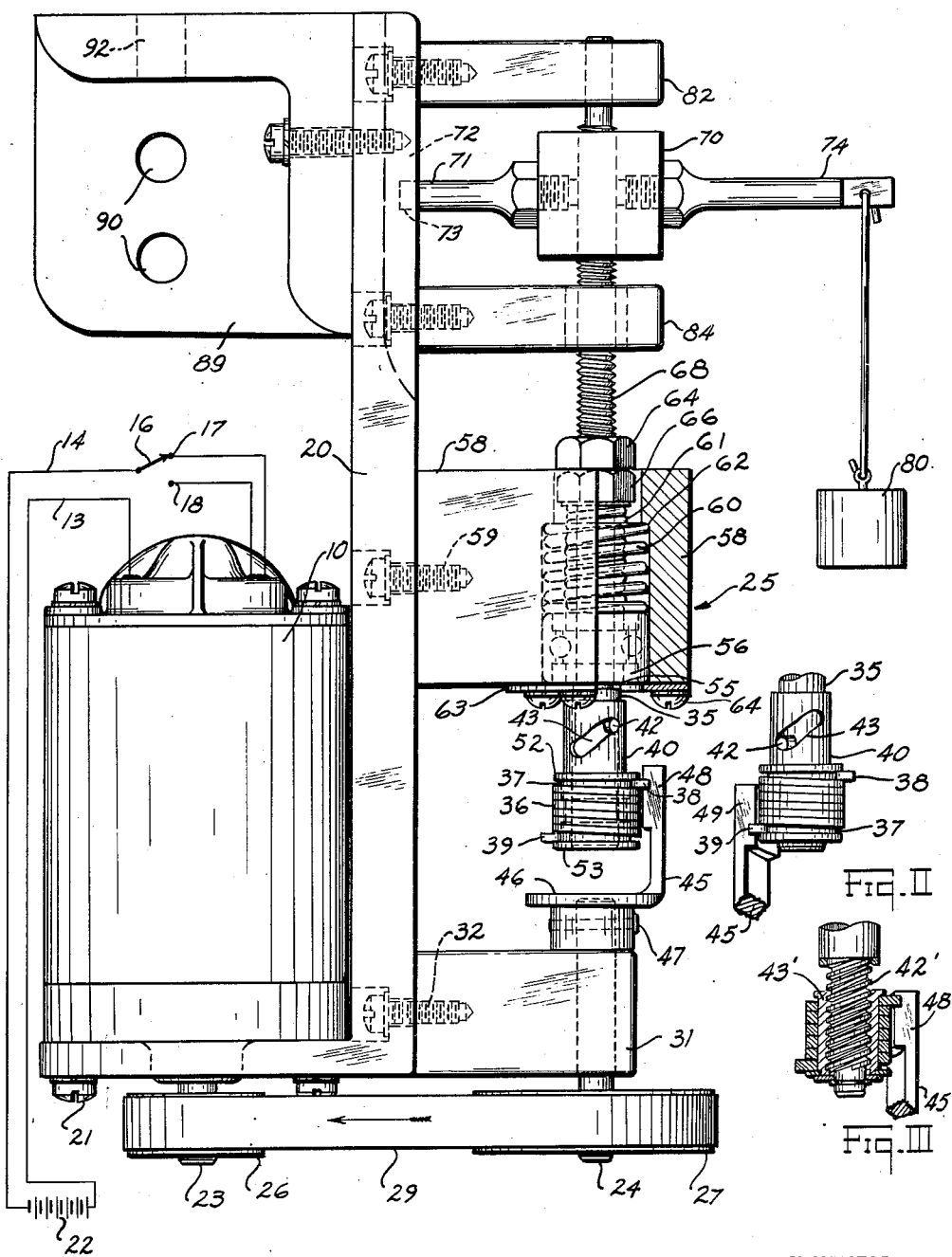
Fig. I
Fig. II
Fig. III
INVENTOR.
James M. Launder
BY
Falvey, Souther & Stoltenberg
ATTORNEYS Oct. 21, 1952        J. M. LAUNDER        2,614,672
OVERLOAD RELEASE FOR LOAD ACTUATOR
Filed Dec. 26, 1947        2 SHEETS—SHEET 2
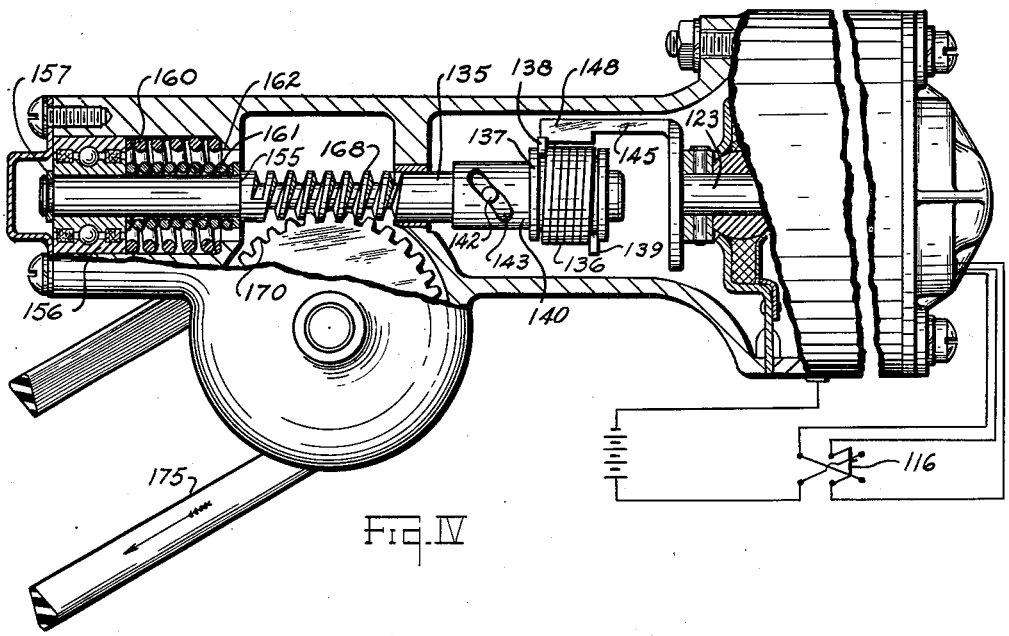
Fig. IV
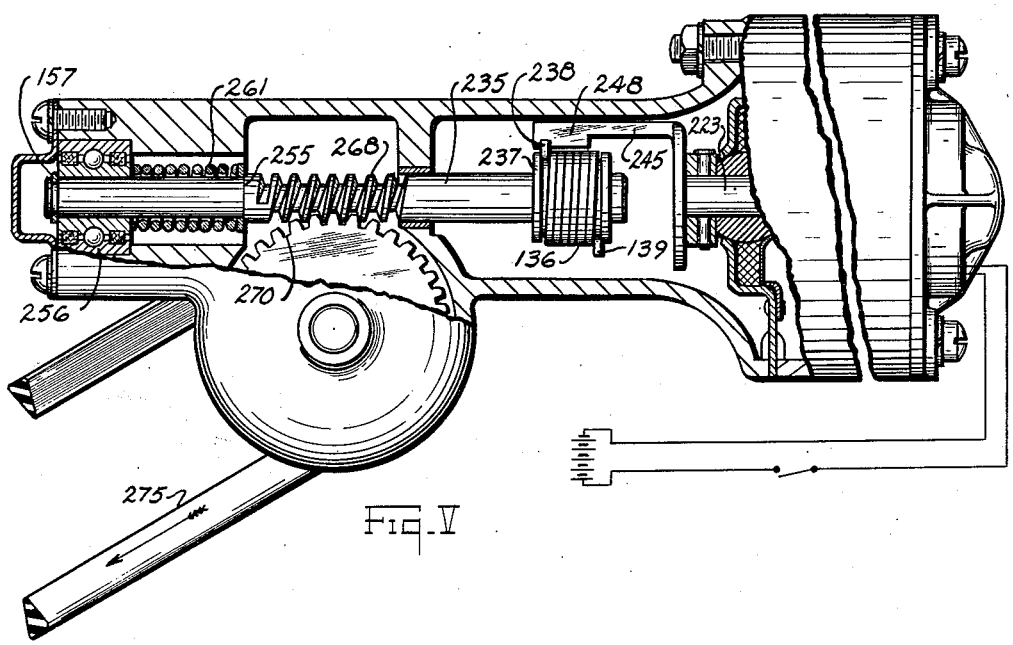
Fig. V
*INVENTOR.*
James M. Launder
BY
Falvey, Souther & Stoltenberg
*ATTORNEYS*

Patented Oct. 21, 1952

2,614,672

UNITED STATES PATENT OFFICE 2,614,672

OVERLOAD RELEASE FOR LOAD ACTUATOR

James Mark Launder, Toledo, Ohio, assignor to The Electric Auto-Lite Company, Toledo, Ohio, a corporation of Ohio Application December 26, 1947, Serial No. 794,070

16 Claims. (Cl. 192—150)

This invention relates to load actuating mechanisms and particularly to a power-driven load actuator operable to transfer force or torque up to a predetermined amount from a suitable source of power or prime mover. The invention has a wide field of application for operating a load from one selected position into another, and is particularly adapted for use in operating component parts of automotive vehicles and aircraft, as well as limiting the amount of torque transmitted to an output shaft from a prime mover.

The invention includes very effective connecting means between a prime mover and an output member for automatically controlling the transmission of a predetermined amount of force or torque or the translation of the rotating drive motion of a prime mover into a predetermined linear force to an output member.

The invention also includes a driving member having a driving connection with a driven member for moving a load, said members being capable of relative longitudinal movement when the load exceeds a predetermined amount or a predetermined resistance is offered to the movement of the load to thereby cause the interruption of the driving connection therebetween, as well as to automatically reestablish said connection when the load or resistance to its movement is decreased to a selected amount.

The invention embraces a self-contained load actuating unit including a reversible source of power or motor for operating an output member through a clutch controlled by a mechanism operable when the load exceeds a predetermined value, which value may be the same or of different amounts for either direction, for breaking and reestablishing the operating connection between the source of power and the output member.

The invention comprehends a remotely-controlled, electrically-actuated load responsive mechanism having having means operable to break and reestablish a driving connection between a prime mover and a load-moving member in accordance with a predetermined load or in response to a predetermined resistance offered to the movement of the load by the moving member, the mechanism inclusive of an electric motor provided with a short, free-running period before the load is actuated thereby.

The invention comprises a positive driving connection between an electric motor and an output member which is rendered inactive when the load exceeds a predetermined amount, so that overloading or stopping of the motor is avoided thereby, eliminating the use of safety switches, as the motor in such event operates under practically no load. Moreover, the said driving connection automatically becomes effective when the load is decreased to the selected pre-determined amount, thus providing a foolproof, remotely-controlled load actuating unit with which the presence of an attendant is not required for initiating or resetting its operation after overloads.

The invention contemplates a load actuator remotely controlled comprising a reversible electric motor for operating an output member through a self-energizing clutch, the latter controlled by a member which is shiftable when a predetermined reaction for actuating the load takes place, thereby interrupting and reestablishing the clutching action of the self-energizing spring in accordance with a predetermined load reaction, it being necessary for the operator to merely operate an electric switch to move the load at will.

The invention is concerned with a power-operated screw type load actuator in which thread-jamming is eliminated as the load on the threads is limited to a selected value while the breakaway torque of the power means or prime mover is not limited in any way.

One object of the invention is to provide a self-contained power-operated unit for moving a load between predetermined stations or positions, including means when the load reaches an obstruction or the end of the selected position, whereby the connection between the power and the load is automatically interrupted and a predetermined force is maintained to retain the load in said position even after the power actuating said unit is disconnected.

Another object of the invention is the provision of a spring preloaded member operatively connected to an electric motor for moving a load to and from selected positions, including means operable for interrupting the connection of the motor and load-moving member in response to a predetermined selected resistance to the movement of said load causing the load to be held in such position under the spring preload irrespective of when the motor is shut off.

Another object of the invention is the provision, in a motor-operated reciprocating load actuator using a screw-thread or equivalent inclined connection for converting the rotary motion of the motor into linear motion, of novel means and organization of parts by which jamming of said inclined connection in either direction under overload does not occur, and in which the break-away torque of the motor to pick the load in opposite direction from the overload is enhanced by providing the motor with a free-running period before the motor is loaded, thus allowing the motor to attain high velocity, gaining thereby more momentum or kinetic energy of rotation for moving said load.

Another object of the invention is to provide a load actuating mechanism comprising a reversible electric motor for operating a longitudinally movable screw shaft by a driving connection operable for rotating the shaft in either direction, and a nut threaded on said shaft for longitudinal movement with respect thereto in response to the rotation of said shaft for moving a load to and from selected position, the shaft being operable when resistance to the movement of the load exceeds different predetermined values for either directions to move longitudinally and break the driving connection of the shaft with the motor and interrupt further movement of said load.

Another object of the invention is to provide a driving connection between a rotatable power driving member and a torque transmitting member for limiting the amount of torque transmitted which includes the provision of a relative movement of one member with respect to the other for rendering said driving connection ineffective when the reaction to the transmission of torque exceeds the selected limit.

Another object of the invention is to provide a power-operated load-moving member including a clutch and a screw-type force-transmitting connection between the power and load-moving member which when an overload occurs or when the load on the threads exceeds a predetermined amount produces the de-clutching of the power and load-moving member, thus preventing the jamming of the threads which takes place under such conditions in conventional screw-type force-transmitting connections.

Another object of the invention is to provide a power-operated member for moving a load to and from a selected point, the driving connection including a snubbing spring operable as a clutch in either direction and a screw-type force-transmitting connection, the arrangement being such that when the load-moving member reaches the allowable end of travel in either direction, the clutch action of the snubbing spring is automatically interrupted and jamming of the screw-type force-transmitting connection is prevented.

Another object of the invention is the provision in a reciprocating power-operated load actuator of a single snubbing spirally-wound spring acting as a one-way clutch to effect thereby a positive driving connection between the power means and the load actuating member irrespective of the direction of rotation of the power means, the single spring operable to render the driving connection ineffective under selected conditions.

Another object of the invention is to provide a spirally-wound clutch spring having convolutions in a slight frictional engagement with either the driving or driven member to produce a clutching engagement therebetween irrespective of the direction of rotation and operable to produce the de-clutching engagement of said members when overloads take place irrespective of the direction of rotation of the driving member.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is an elevational view with a portion broken away to show an embodiment of the load actuator of the invention set for action when the motor rotates moving the belt as indicated by the arrow;

Fig. II is a fragmentary elevational view showing in another position the driving connection of the device of the invention when the motor is rotated in a direction opposite to the one shown in Fig. I.

Fig. III is a fragmentary sectional view illustrating the modification of the means responsive to direction of rotation for the driving connection;

Fig. IV is an elevational view of parts broken away and in section to show another embodiment of the invention; and Fig. V is a view similar to Fig. IV illustrating another form of the invention.

Referring to the drawings, and particularly to Fig. I, which shows a preferred form of the self-contained power-operated load actuator of the invention, the source of power or prime mover may take the form of a motor 10 which may be of any suitable type and capable of being energized from any desirable source of power. The motor 10 is preferably of the electric reversible type having series characteristics energized from a storage battery 12 by means of current-conducting leads 13 and 14. The lead 13 is connected directly to a motor terminal and lead 14 is preferably connected to a reversing switch which may be disposed at a point remote from the unit of the invention.

The reversing switch shown comprises a conducting blade 16, normally in open circuit position, adapted to be moved into engagement with either one of the motor field terminals 17 or 18 to cause the selective energization of oppositely wound field coils which control the direction of rotation of the series motor and simplify the switching and reversing connections. The motor 10 is shown as detachably mounted on a flange of an L-shaped supporting structure 20 by means of suitable attaching means such as screws 21 having its power shaft 23 extending through a suitable opening and connected by suitable power-transmitting means to the driving member or rotatable shaft 24 of the load actuator unit 25 which is also mounted on the support 20. The power-transmitting means between the motor shaft 23 and the load actuator driving member 24 is shown in the form of pulleys 26 and 27 directly affixed to the said members and being interconnected by a belt 29 to cause the rotation of one shaft by the other. However, it is contemplated that the shafts 23 and 24 may be directly connected if desired, as shown in Figs. IV or V.

The driving member, or rotatable shaft 24 of the load actuator, is journaled or mounted for rotation on a suitable bearing supported by post 31 shown as being secured to the frame 20 by screws 32 and has an operable driving connection with the driven member 35. The driving connection contemplated is in the form of a readily shiftable one-way actuating clutch operable in either direction of rotation which has associated therewith means responsive to the direction of rotation of the driving member 24 to effect said driving connection with the driven member 35 for its rotation in either direction by the driving member 24.

The driving connection and associated means responsive to direction of rotation between the driving and driven members 24 and 35 are shown in the form of a snubbing self-energizing spring clutch 36 mounted for clutching engagement with a clutching surface 37 carried by the driven member 35. The spring clutch 36 comprises a plurality of tight convolutions formed of flat or rectangular spring wire spirally wound in a left-hand direction and is provided with projecting means or integrally-projecting tabs 38 and 39 at each end thereof. Some of the convolutions of the spring clutch 36 are in slight frictional contact or engagement with the clutch surface 37 carried by the member 35 to provide the self-clutching action therewith.

The clutch surface 37 cooperating with the spring clutch 36 is provided on the outer surface of a tubular member or sleeve 40 suitably mounted on and connected to the driven member 35 by an inclined connection which, as shown in Fig. I, may take the form of a fixed pin 42 and an inclined slot 43 provided respectively on each of said members. The inclined connection may take the form of suitably threaded connection 42' and 43' between the driven member as a sleeve as shown in Fig. III. The inclined connection 42—43 provides the spring 36 and its cooperating clutching surface 37 with positive rotary movement with the driven member 35 as well as limited rotary and longitudinal movement with respect to the driven and driving members and, in turn, to the motor or power shaft 24, and forms the means responsive to the direction of rotation of the driving member 24 to effect its operative connection with the driven member 35.

In order to effect the clutching action of the spring 36 on the clutch surface 37, spring-energizing means are carried by the driving member 24 shown in the form of a tubular section 45 integrally projecting from a collar 46 fixed to the driving member 24 preferably by a tapered pin 47. The clutch spring energizing element 45 is provided with lateral driving surfaces 48 and 49 vertically disposed for cooperative engagement with the spring-projecting tabs 38 or 39. The axial or longitudinal dimension of the element 45 is correlated with the axial or longitudinal dimension or distance separating the spring-projecting means or tabs 38 and 39 and for best results is should be slightly greater than such dimension for the purpose hereinafter described in detail. In the forms shown, the longitudinal dimension of the clutch-energizing element 45 closely corresponds to the longitudinal dimension of the clutch spring 36 inclusive of its projecting ends or tabs.

The spring clutch 36 is held or confined against longitudinal movement on sleeve 40 between a projecting flange 52 formed therein with which the tab 38 is in engagement and a split retainer or detachable washer 53 engaging the spring tab 39, so that the longitudinal movement of the clutch spring 36 with respect to the driving member is dependent upon the effective axial length of the inclined slot 43 formed on sleeve 40. The inclined connection between the sleeve 40 and the driven member 35 for moving longitudinally the spring clutch 36 constitutes one of the means provided for allowing the electric motor, with a free-running period and to attain high velocity and more momentum or kinetic energy of rotation before the same is loaded by moving the driven member 35 and the load actuated thereby.

The driven member 35 is mounted for relative longitudinal movement with respect to the clutch element 45 fixed to the driving member 24 and is formed with a reduced portion providing a shoulder 55 engageable with a radial and thrust bearing 56 slidably supported on the upright 58 fixed to a support 20 by screws 59. The longitudinal movement of member 35 is restrained by the oppositely actuating preloaded resilient means 60 and 61 which normally hold the member 35 in a relatively fixed position. The preloaded resilient means may take the form of a coil spring 60 compressed to a predetermined value and confined after calibration between the inner surface of the outer race of the bearing member 56 and the shoulder 62 formed on the support 58. The bearing member 56 is retained in the support 58 by a suitable collar 63 fixed thereto by screws 65. The diameter of the precalibrated coil spring is such that the same is capable of accommodating another preloaded resilient member such as a coil spring 61 which is retained after calibration in its preloaded condition against the inner race of the bearing member 56 and the threaded nuts 64 and 66 locked in position on the driven member 35. The bearing 56 has a sliding fit with the reduced portion of the driven member 35 in one direction and is movable in the opposite direction with the driven member through the shoulder 55.

The member 35 is formed with an inclined connection for converting its rotary motion into a linear motion. This connection may take the form of a jack-screw section 68 thereon with which is in threaded engagement the non-rotatable threaded member or reciprocating nut 70 which constitutes an output or load-moving member. The member 70 is provided with suitable means such as the projecting arm 74 adapted to carry or be connected to any suitable load such as is shown diagrammatically by a weight 80. This weight may correspond to any component part of automotive vehicles or aircraft movable or operable between selected positions. The limits of the allowable travel are diagrammatically defined by the spaced members 82 and 84 fixedly secured to the support 20 by suitable means. As particularly shown in Fig. I, the stop member 84 is formed with an aperture to allow the free passage of the threaded section 68, and the member 82 is provided with a bearing to accommodate the reduced portion of the driven member 35, thereby permitting the rotary and longitudinal movement of the driven member with respect to the stop members.

The output or load-moving member 70 has fixed thereto another arm 71 having its outer end 73 in engagement with a vertical groove or channel 72 to prevent its rotary movement with respect to the output member but which allows free longitudinal movement with respect thereto and prevents the transmission of rotary motion to the load, so that the same is moved in a linear direction.

In order to provide a means to attach the self-contained unit of the invention to any component part of an automotive vehicle or aircraft, supporting structure 20 has connected thereto an attaching bracket 89 provided with suitable apertures 90 and 92 located in vertical and horizontal planes so as to permit the device to be used for lowering or raising a load such as a window pane and opening and closing a closure or members requiring a linear movement in a vertical direction or plane between selected positions or sliding a door or member adapted to be moved horizontally between selected positions.

From the foregoing it can be seen that the operation of the embodiment shown in Figs. I to III may be summarized as follows: with the motor reversing switch blade 16 connected, as illustrated in Fig. I, the motor shaft 23 will be rotated in a counter-clockwise direction imparting movement to the belt 29 in the direction indicated by the arrow. This will cause the clutch energizing member 45 to have its driving surface 48 in engagement with the inner surface of the spring projecting tab 38 and the upper end of the slot 43 into contact with the pin 42 carried by the driven member 35, as is particularly shown in Fig. I. After the initial contact is established between driving surface 48 and the spring-projecting tab 38, the self-clutching or snubbing action of the spring takes place. This action takes place due to the frictional engagement of the convolutions of the spring clutch 36 with the clutching surface 37 cooperating therewith which is carried by the driven member 35, this establishing a positive driving connection between the driving and driven members and moving the driven member in a counter-clockwise direction. The movement of the driving member in a counter-clockwise direction is manifested in this form of the invention in a downwardly direction by the movement of the output or load-moving member 70 lowering the weight 80 until the output member 70 reaches the limit of its travel as defined by member 84. When the load or weight 80 reaches the end of its allowable travel, the output or load-moving member will be in engagement with the stop member 84 opposing further longitudinal movement thereof and the same will cause the driven member 35 to move in an upward direction moving the bearing member 56 in the same direction against the forced action of the preloaded spring 60 and moving the end of the spring tab 38 out of contacting engagement with the driving surface 48. When such position of the parts takes place, the load-moving member will be held in position against the stop member 84 under the preloaded value of the spring 60 even though the positive driving connection between the driven and driving members has been discontinued. When the driving surface 48 is out of engagement with the spring tab 38, the driving member has a period of free rotation until the surface 48 is placed in engagement with the outer surface of the coil spring projecting tab 39 causing the self-clutching action of the spring to be stopped by driving the spring in a non-snubbing relation. This will stop the driving connection between the driving and driven member and permit free rotary movement of the motor.

If the operator desires to raise the weight 80 or move the load in the opposite direction, that is, returning it to its original position, it will only be necessary to move the switch blade 16 into contacting engagement with the motor field terminal 18. This connection will cause the motor to rotate clockwise moving the belt 29 in a direction opposite to that shown by the arrow, thereby rotating the driving member 24 also clockwise. The clockwise rotation of the driving member 24 will cause the driving surface 48 of the clutch-energizing member 45 to move out of contact with the spring clutch tab 38 moving its driving surface 49 into initial engagement with the inner face of the spring clutch tab 39. This initial engagement will impart motion to the sleeve 40 in a clockwise direction until the lower end of the slot 43 is in contact with the pin 42. The parts will be in the position shown in Fig. II. By this arrangement, the motor shaft or power member 23 will be provided with a free-running period before moving the load by member 35.

The free-running period permits the motor to attain high velocity, adding thereby to its breakaway torque the kinetic energy stored during such running period, so that the motor has an added torque to pick up and move the load in the opposite direction, overcoming thereby any preloading of the spring members.

With the parts in engagement, as shown in Fig. II, and after the initial contact is established, the rotation of the driving member in a clockwise direction will cause the self-clutching or snubbing action of the spring 36 to take place by moving the spring tab 39 in a clockwise direction and causing the convolutions to tightly grip the clutching surface 37 carried by the driven member 35, thus establishing a positive driving connection between the driving and driven member and moving the driven member 35 in a clockwise direction.

With the driving member 35 rotating in a clockwise direction, the load-moving member 70, by means of the left-hand screw thread connection with member 35 will remain stationary until the bearing member 56 has moved downwardly to unload the spring 60 and then will raise the weight 80 until the same reaches the limit of its allowable travel, as defined by stop element 82, whereby further rotary movement will load said threaded connection to cause the driven member 35 to move in a downward direction against the preloading of the spring 61, moving the shoulder 55 out of contacting engagement with the bearing member 56 and, in turn, sliding the clutch spring tab 39 out of driving relation with the lower portion of the driving surface 49. When such disengagement takes place, the load-moving member 70 will be held against the stop member 82 and the load carried thereby or weight 80 will be retained in position under the preloaded value of the spring 61 even though the positive driving connection between the driving and driven members has been discontinued by the disengagement of the spring tab 39 with the driving surface 49. The disengagement of the spring tab 39 by the surface 49 will permit the motor to rotate freely until driving surface 49 is placed into engagement with the outer face of the projecting tab 38 stopping the snubbing or self-clutching action of the spring and driving the same in a non-snubbing or non-clutching relation of the convolutions with clutch surface 37 permitting the motor to rotate substantially under no load.

It can be seen from the foregoing that when the load reaches the limits of its allowable travel, or meets an obstruction in its movement thereto, jamming of the threaded connection is overcome as the load transmitted thereto is dependent entirely upon the preloaded values of the resilient member 60 or 61.

Moreover, it should be noted that when the resistance to the movement of the load-moving member or to the load itself increases to an amount greater than the preloaded values of the springs for either direction, the driving connection between driving and driven member is automatically interrupted. Thus the predetermined preloading values of the spring means which oppose the relative movement of the driven member with respect to the driving members fully control the moving force to actuate the load, and it is to be understood that such values may differ or be the same if desired.

In the form of the invention shown in Fig. IV, the arrangement of the principal elements of the invention to secure the driving connection of the self-clutching spring in either direction of rotation is substantially the same as shown in Figs. I and II. However, the motor shaft 123 of the reversible motor has directly connected thereto the clutch energizing member and the circuit connections for securing the reversal of its rotation is obtained by means of a conventional double throw double pole switch 116 which serves to reverse the field connections of the motor to obtain the rotation of the motor in either direction as is well known in the art.

In the form of the invention illustrated in Fig. IV, the driven member 135 is provided with a worm section 168 for actuating the worm gear 170 mounted in cooperative relation thereto and adapted to transmit, by means of a suitable belt 175, a predetermined torque for either direction.

The arrangement of the driven member 135 with respect to the driving member or clutch-energizing element 145 is such that relative longitudinal movement may take place when the motor is rotated in a counter-clockwise direction to rotate the worm gear 170 for moving the belt 175 in the direction of the arrow, as the reaction to the transmission of torque is such that when the torque increases over a predetermined amount, the driven member 135 is moved longitudinally to the left against the opposing force of the preloaded inner spring 161 causing the disengagement of the driving surface 148 with the spring tab 138 in a similar manner as hereinbefore described in connection with the embodiment of the invention illustrated in Fig. I. When such action takes place, the worm gear 170 and, in turn, the load driven by the belt 175 is retained or held in position under the force of the preloaded spring 161 even though the driving connection between the motor and driven member 135 has been discontinued. The functional operation thereafter for permitting the motor to run under practically no-load is substantially the same as hereinbefore described in connection with the embodiment shown in Fig. I.

In case the operator desires to actuate a load in the opposite direction, or transmit torque in another direction than the one hereinbefore described, the electric motor field is energized, so that the motor shaft rotates in a clockwise direction moving the elements of the driving connection to the positions best shown in Fig. II, wherein the belt 175 will be moved in an opposite direction than the one indicated by the arrow.

The change of the parts from the position shown in Fig. I to the position shown in Fig. II, which also takes place in the form of the invention shown in Fig. IV when the direction of rotation of the motor is changed from counter-clock to clockwise direction by the proper manipulation of the reversing switch, provides the motor with a free-running period before picking up full load, due in large extent to the relatively small transverse dimension of the tubular section of the spring clutch engaging element 145, also present in this form of the invention, and also to the free effective rotary motion of the sleeve 140 caused by the means responsive to the direction of rotation such as the pin and slot connection 142—143. This free-running period gives the motor an opportunity to build up kinetic energy which aids the motor torque in overcoming the static load and the unloading of the spring 161 to bring back to neutral position the worm section 168 once the clockwise driving relation has been established by the self-clutching action of the clutch 136.

When the clockwise driving relation has been fully established and after the worm section 168 has been moved to neutral, central position, the belt 175 will act as means to transmit torque in an opposite direction than that shown by the arrow of Fig. IV and drive a load providing a predetermined torque. Opposition to the movement of the belt 175 in such direction will be manifested by a reactive force tending to move the worm section 168 of member 135 towards the right in opposition to the force offered by the spring 160 through the thrust bearing 156 to the stop washer 157 of member 135. When the opposition to the movement of the belt 175 or to the torque transmitted thereby is increased to produce a reactive force on the worm 168 sufficient to overcome the preloaded value of the spring 160, the worm 168 will cause the member 135 to move to the right, sliding the spring clutch tab 139 out of engagement with the cooperating driving surface of the driving member 145.

The sliding action of the spring tab 139 out of engagement with its cooperating driving surface will discontinue the self-clutching action of the spring clutch 136 and interrupt the driving connection between the motor and the driven member 135 placing the load as well as the worm gear 170 under the preloaded value or force of the spring 160. It can be seen that in this form of the invention the same basic principles incorporated in the embodiment shown in Fig. I are utilized to secure the transmission of the predetermined torque irrespective of the direction of rotation of the driving motor or power shaft and that the relative motion or relative longitudinal movement between the driving and driven members which is opposed by the preloaded value of suitably calibrated springs, serves to limit and govern the amount of torque transmitted from the motor by the worm gear 170 to actuate any rotatable load or mechanism.

In the embodiment of the invention shown in Fig. V, the main principles hereinbefore outlined, as incorporated in the form of the invention shown in Fig. IV, are also manifested. However, the same are utilized to secure the transmission of a predetermined torque in only one direction and, therefore, the clutch surface 237 is fixed to the driven member 235 thereby omitting the inclined connection interposed between the self-actuating clutch 136 and driven member 135 shown in Fig. IV, as well as the preloaded spring 160 which opposes the longitudinal movement of the driven member 135 toward the right which is effective when the motor is rotated in a clockwise direction.

In the form of the invention shown in Fig. V, the motor rotates only in a counter-clockwise direction when energized, moving the belt 175 in the direction of the arrow and, therefore, the reactive force of the worm 268 tends to move the driven member 235 to the left in opposition to the force of the preloaded spring 261 confined between bearing 256 and shoulder or stop washer 255 and thereby serves to transmit a predetermined torque in a counter-clockwise direction.

However, when the reactive force on the worm 268 increases over the opposing preloaded value of the spring 261, which may be caused by a greater opposition to the movement of belt 275, the worm section 268 moves to the left the driven member 235 causing the disengagement of the spring clutch tab 238 with the driving surface 248 and thereby interrupting the driving relation between the motor and the driven member 235. When the driving relation is interrupted, the worm gear 270 actuated by the worm section 268 and, in turn, the load driven by the belt 275 is held in position under the force of the preload of spring 261 irrespective of when the power is disconnected from the motor. The function of the spring clutch for permitting the motor to run under practically no load is the same as before described in connection with the other forms of the invention.

It should be noted that all the embodiments of the invention, and particularly the forms shown in Figs. I and IV are highly adaptable for use with devices which are locked after the same reach one position by the use of the conventional lock and key, such as garage doors and other types of closures, because, by the use of the mechanism of the invention, such conventional locking means can be dispensed with. This is accomplished on account of the fact that when the load, such as a garage door, reaches the limits of its allowable travel, such as the door jamb, the reaction of the load on the load-moving member will interrupt the driving connection of the power shaft with the load actuating or driven member and thereafter retain the load in such position in the preloaded values of the resilient means, as has hereinbefore been described.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In combination, a driving member, rotatable in either direction, a driven member operated by said driving member for actuating a load, a coil spring having convolutions normally in slight frictional engagement with one of said members with each of its ends freely projecting therefrom; spring-energizing means associated with the other member for engaging either of the freely projecting ends of said coil spring, and means responsive to the direction of rotation of the driving member including an inclined torque-transmitting connection providing limited rotary and longitudinal movement between said coil spring and energizing means to cause said energizing means to selectively engage the freely projecting end of said spring which produces the self-clutching engagement of said spring whereby a driving connection is established between the driving and driven members irrespective of the direction of rotation of the driving member.

2. In combination, a driving member, a driven member operated by said driving member for actuating the load and axially movable with respect to the driving member by the load reaction, a coil spring clutch mounted for clutching and de-clutching engagement with one of said members, energizing means for said coil spring carried by and functioning in response to the operation of the other of said members, said coil spring and energizing means having portions in engagement and arranged for relative axial movement therebetween whereby when the same are placed in one relation clutching engagement of the spring is established effecting a positive driving connection between said members and when another relationship takes place due to axial relative movement the de-clutching action of said spring occurs interrupting said driving connection, and load-sensitive resilient means connected to the driven member to resist the load reaction and operable to permit the axial movement of the driven member when the load exceeds a predetermined amount to cause relative axial movement between said spring and energizing means whereby their relationship is changed from the clutching to the de-clutching action of the spring.

3. A load actuating mechanism comprising a reversible electric motor, a member connected to a load for moving the load to and from selected positions, clutching means for driving by the electric motor the load moving member, an axially slidable element operable by load reaction forming a part of said clutching means, a load-sensitive spring means preloaded to predetermined values connected to said slidable element for opposing the sliding axial movement of said element, said spring means operable to permit the sliding axial movement of said element when the resistance to the movement of said load reaches the preloading values of said spring means in either direction to stop the driving by the electric motor of the load moving member by rendering ineffective said clutching means, the load-sensitive means operate through the load moving member when the clutching means are ineffective to retain the load under such spring means preloaded value irrespective of when the reversible electric motor is disconnected, and means providing the motor with a free-running period before the motor is loaded thereby permitting the motor to attain more momentum before taking up the load.

4. A power operated load actuator comprising a power operated rotatable driving member, a driven member actuated by said driving member and axially movable with respect thereto by load reaction, means associated with the driven member for converting rotary movement for moving a load to and from a selected position into linear movement, a spirally wound spring interposed between said driving and driven members, said spring having free ends with several convolutions in a slight frictional engagement with one of the members to produce the self clutching engagement between said members when one of its free ends is engaged by the other member, and load-sensitive resilient means connected to the driven member to normally opposing its axial movement and operable to permit on overloads said axial movement to stop the self clutching engagement of the spring by interrupting the engagement of the free end of the spring and member to permit free rotary movement of the driving member.

5. A load actuator comprising a driving member, a driven member operable by the driving member for actuating a load and axially movable by load reaction with respect to the driving member, one of said members being provided with an element having a clutching surface, a helical clutch spring carried by said clutch surface by having its convolutions in contact therewith for clutching engagement therewith and provided with projecting means on each end thereof for contracting said convolutions into tight engagement with the clutch surface in response to the direction of rotation of the driving member, an energizing element rotatable with the other of said members arranged for selective engagement with one or the other of the spring projecting means, said spring projecting means and energizing element being adjustable relative axial to the other to effect selective engagement therewith, and means responsive to a predetermined load for causing relative movement between the spring projecting means and said energizing element to interrupt the driving connection between the driving and driven member by causing the declutching action of the spring with said clutching surface.

6. A power operated load actuator comprising a power operated driving member rotatable in either direction, a driven member adapted to be rotated by said driving member and axially movable with respect thereto by load reaction, a threaded connection in cooperative relation with the driven member for converting rotary movement into linear movement for moving a load, a snubbing spring clutch interposed between said members operable to produce a positive driving connection therebetween irrespective of the direction of rotation of said driving member, and spring means compressible to allow the axial movement of the driven member to stop the driving connection between said members when the load on said threaded connection exceeds a predetermined value and thereafter permits free rotary movement of the driving member preventing the jamming of said threaded connection.

7. A load actuating mechanism comprising a reversible electric motor, a longitudinally movable driven screw shaft, a clutching connection of said shaft and the electric motor for causing the rotation of the shaft in either direction, a non-rotatable nut having threaded connection with said shaft for converting rotary movement of the shaft into linear movement for moving a load to and from a selected position, and load-sensitive resilient means connected to said shaft being operable when the force on the threaded connection due to resistance to the linear movement of the load exceeds different predetermined values for either directions to allow said screw shaft to move longitudinally and thereby stop the clutching connection of the shaft with the motor preventing thread jamming and abruptly interrupting further movement of said load irrespective of when the electric motor is stopped.

8. In combination, a reversible power operated rotatable driving member, a driven member actuated by said driving member for transmitting a predetermined torque in either direction and axially movable by load reaction, a spirally wound spring interposed between said driving and driven members, said spring having convolutions in a slight frictional engagement with one of the members and with its ends being free for receiving rotary force from the other member to produce the self clutching engagement between said members, and load-sensitive spring means having an adjustable connection with the driven member adapted to be flexed to allow axial movement of the driven member to stop the self-clutching engagement of the spring to permit free rotary movement of the driving member when the resistance to the transmission of torque exceeds different predetermined values secured by manipulation of said adjustable connection for either direction of rotation.

9. In combination, a driving member, an output member adapted to be operated by the driving member for actuating a load and axially movable by load reaction with respect to the driving member, a clutch surface provided with one of said members, a helical spring operatively connected to said clutch surface by having some of its convolutions in surface contact therewith and with its ends being free and projecting radially to effect frictional clutching and de-clutching engagement with said clutch surface respectively, energizing means for said spring clutch carried by the other member for engagement with the projecting end of said spring which establishes clutching engagement with said clutch surface to effect a positive driving connection between said members, a fixed support, and load-sensitive resilient means interposed between said support and output member to resist axial movement of the output member under normal load reaction, said load-sensitive resilient means having a predetermined value for flexing when the load exceeds a predetermined amount to permit axial movement of the output member causing said spring energizing means to engage the projecting end of the spring which establishes the de-clutching action to stop movement of the load and the said load-sensitive means concurrently operating on the load output member to hold the load in a fixed position under the predetermined flexing value of said load-sensitive resilient means.

10. In combination, a driving member rotatable in either direction, a driven member operated by said driving member for actuating a load, a clutch surface, an inclined torque-transmitting connection between said surface and one of said members providing limited axial movement of said surface with respect to said member and restraining rotational movement therebetween, a clutch spring having each of its ends freely projecting radially therefrom and provided with convolutions frictionally contacting said clutch surface and adapted to be tightened for clutching engagement with said clutch surface, a spring clutch energizer carried by the other member for engaging either projecting end of said spring, said energizer functioning in response to the action of said inclined connection to engage the projecting end of said spring which produces the clutching engagement between said spring and surface to establish a driving connection between the driving and driven members irrespective of the direction of rotation of the driving member.

11. In combination, a driving member, a driven member adapted to be operated by the driving member for actuating a load and axially movable by load reaction with respect to the driving member, a clutch surface on the driven member, a clutch spring operatively connected to said clutch surface by having some of its convolutions in surface contact therewith and with its ends extending freely and projecting radially to effect frictional clutching and de-clutching engagement with said clutch surface respectively, energizing means concentric with said clutch spring carried by the driving member for engagement with the projecting end of said spring which established clutching engagement with said clutch surface to effect a positive driving connection between said members, a fixed support, and load-sensitive compressible means on the support and being connected to the driven member to resist its axial movement under normal load reaction, said load-sensitive means having a predetermined compression value and adapted to be compressed when the load reaction exceeds a predetermined amount to permit axial movement of the driven member for moving the clutch spring causing the freely projecting end which establishes the de-clutching action to be engaged by the energizing means to stop movement and the said load-sensitive means simultaneously operating through the driven member to hold the load in a fixed position under the predetermined compression value of said load-sensitive compressible means.

12. A load actuator comprising a reversible rotatable driving member, an output member for reciprocating a load being coaxial with the driving member and axially movable by load reaction with respect thereto, means coacting with both members to establish a driving connection therebetween which is interrupted for either direction upon axial movement of the output member, a stationary support carrying the output member for rotary and axial movement, a plurality of yielding means surrounding a section of the output member and connected at their ends to said support and output member, each of said yielding means preset to a value that allows axial movement of said output member when the load reaction exceeds a preset amount in either direction for interrupting the driving connection, and said yielding means acting through said output member upon interruption of the driving connection to hold the load stationary under their preset value regardless of when the rotation of the driving member is stopped.

13. In combination, a power operated rotatable driving member, a driven member adapted to be connected with the driving member for transmitting a predetermined torque, stationary means supporting said driven member for rotary and axial movement, the latter in response to torque reaction, a clutch surface carried by the driven member, friction clutch means mounted on said clutch surface, means associated with said clutch means arranged in axially spaced relation forming an unloading clutch producing end and a load carrying end, energizing means for said clutch means carried for rotation with the driving member for engaging only the load carrying end of the clutch means to produce the frictional clutching action on said clutch surface to effect thereby a torque transmission driving connection between the members, the axial movement of the driven member causing the disengagement of the load carrying end of the clutch means from the energizing means and thereafter the engagement of its unloading end with the energizing means, and resilient means interposed between the driven member and its supporting means normally opposing the said axial movement of the driven member, said resilient means operable when the torque reaction exceeds a predetermined value to permit the said axial movement of the driven member to thereby render the frictional clutching action of said clutch means ineffective, and the said resilient means functioning when the torque reaction is decreased to said predetermined value to automatically return the driven member to its normal position to thereby reestablish the frictional clutching action of said clutch means.

14. A power operated load actuator comprising a rotatable reversible driving member, a driven member adapted to be rotated by the driving member in either direction for operating a load and being axially movable with respect thereto by load reaction upon the imposition of overloads, a clutch surface mounted for rotation with the driven member and being axially shiftable with respect to the driven member in response to the direction of rotation imparted to the clutch surface, frictional clutch means operable for driving engagement with said clutch surface and axially movable therewith, said clutch means formed with an unloading section and with a load carrying section axially spaced, rotatable means operated by the driving member for rotating said clutch means and causing the axial displacement of said clutch surface for the selected engagement of said rotatable means solely with the load carrying section of said clutch means to produce its driving engagement with said clutch surface to effect a driving connection between the members, and resilient means normally opposing axial movement of the driven member, said resilient means being operable to permit the axial movement of the driven member caused by load reaction upon the imposition of overloads to axially shift the clutch means while in driving engagement with the clutch surface to effect the disengagement of the load carrying section with said rotatable means and the engagement of the said rotatable means with the clutch means unloading section to thereby stop the driving connection between the members and thereafter permit the free rotary movement of the driving member irrespective of its direction of rotation.

15. A reversible load actuating mechanism comprising a non-rotatable threaded member connected to a load for reciprocating the same between selected positions, a rotatable member axially movable in a rearward direction by load reaction having a threaded connection with the non-rotatable member so that rotation of the rotatable member will produce linear movement of the non-rotatable member to thereby move the load to a selected position, means supporting said rotatable member for rotary and axial movement, a pair of concentrically disposed compression springs for opposing the rearward axial movement of the rotatable member in either direction, each of said compression springs having one end in engagement with said supporting means, adjustable connections between the other end of each of said springs and said rotatable member whereby each one of the compressible springs is provided with a predetermined preloaded value to resist the axial movement for either direction of the rotatable member under normal load reaction and permit its axial rearward movement when an overload takes place, power means for rotating the rotatable member, transmission means operable to establish a driving connection between the power means and said rotatable member, an element of said transmission means being axially slidable for rendering ineffective said transmission means, means functioning upon a predetermined degree of axial movement of the rotatable member due to load reaction to impart axial sliding motion to the element of said transmission means for rendering the transmission means ineffective to thereby stop the driving connection between the rotatable member and the power means preventing thread jamming between the threaded members and permitting thereafter free rotary movement of the power means.

16. A load actuator including a first threaded member operably connected to a load, a second threaded member engaging the first threaded member so that rotation between said members will produce linear movement of a load, the second member being axially movable in a rearward direction by load reaction, means for supporting said second member for rotary and axial movement, load-sensitive compressible means having one end in engagement with said supporting means, an operable connection between the other end of said compressible means and said second member to provide a predetermined preloaded value to said load-sensitive means to resist axial movement of the second member under normal load reaction and permit said axial movement when an overload takes place, power operating means for rotating said second member, torque-transmitting means located between the power means and the second member having an unloading end and a load-carrying end, means rotated by the power means for engaging solely the load-carrying end of said torque transmitting means to establish a driving connection for the transmission of torque from the power means to the second member, means functioning upon a predetermined degree of sliding axial movement of the second member to cause the disengagement of the power means with the load-carrying end and the engagement of the power means with the unloading end of said torque transmitting means to interrupt said driving connection when an overload takes place, the said compressible means acting through said first threaded member to retain the load in a fixed position under their predetermined preloaded value when said driving connection is interrupted, and said load sensitive compressible means functioning to automatically return the second threaded member to its normal position when the overload is removed for reestablishing the said driving connection irrespective of when the power means stops.

JAMES MARK LAUNDER.

REFERENCES CITED

The following references are of record in the file of this patent:

UNITED STATES PATENTS

| Number | Name | Date |
| --- | --- | --- |
| 1,163,799 | Winkley | Dec. 14, 1915 |
| 1,186,188 | Hely | June 6, 1916 |
| 1,829,249 | Von Beulwitz | Oct. 27, 1931 |
| 1,954,620 | Connell | Apr. 10, 1934 |
| 1,966,267 | Starkey | July 10, 1934 |
| 2,052,152 | Webb | Aug. 25, 1936 |
| 2,174,342 | Grenlich | Sept. 26, 1939 |
| 2,214,487 | Starkey | Sept. 10, 1940 |
| 2,360,187 | Almen | Oct. 10, 1944 |
| 2,391,470 | May | Dec. 25, 1945 |
| 2,407,537 | Chapman | Sept. 10, 1946 |

FOREIGN PATENTS

| Number | Country | Date |
| --- | --- | --- |
| 158,770 | Germany | Mar. 7, 1905 |